United States Patent
Wilber

Patent Number: 5,177,413
Date of Patent: Jan. 5, 1993

[54] ARRANGEMENT FOR GENERATING A BEAM CURRENT INDICATIVE SIGNAL

[75] Inventor: James A. Wilber, Indianapolis, Ind.

[73] Assignee: Thomson Consumer Electronics, Inc., Indianapolis, Ind.

[21] Appl. No.: 841,104

[22] Filed: Feb. 25, 1992

[51] Int. Cl.⁵ .............................................. H01J 29/52
[52] U.S. Cl. ..................................... 315/383; 315/371
[58] Field of Search ............... 315/383, 371; 358/243, 358/168, 169

[56] References Cited

U.S. PATENT DOCUMENTS 3,541,240  11/1970  Curtis
4,067,048  1/1978  Norman ............................ 315/30
4,167,025  9/1979  Willis
4,752,722  6/1988  Erratico et al.

OTHER PUBLICATIONS

Schematic Diagram Sheets 1, 2, 3, 5, A and M1 of Television Receiver Circuit CTC 168/169.
A schematic of a Television Receiver Chassis, CTC168/169.

Primary Examiner—Theodore M. Blum
Attorney, Agent, or Firm—Joseph S. Tripoli; Joseph J. Laks; Sammy S. Henig

[57] ABSTRACT

In a vertical deflection circuit, a vertical deflection current is controlled by a vertical sawtooth signal. A transistor generates a first control signal that is derived by sensing the beam current. The control signal is used for modulating the vertical sawtooth signal to compensate for a tendency of the raster height on a screen of a cathode ray tube to increase when the ultor voltage decreases. The transistor also clamps a second control signal that is indicative of the beam current to a predetermined level when the beam current is smaller than a predetermined value. The second control signal is coupled to an automatic beam current limiter.

13 Claims, 1 Drawing Sheet

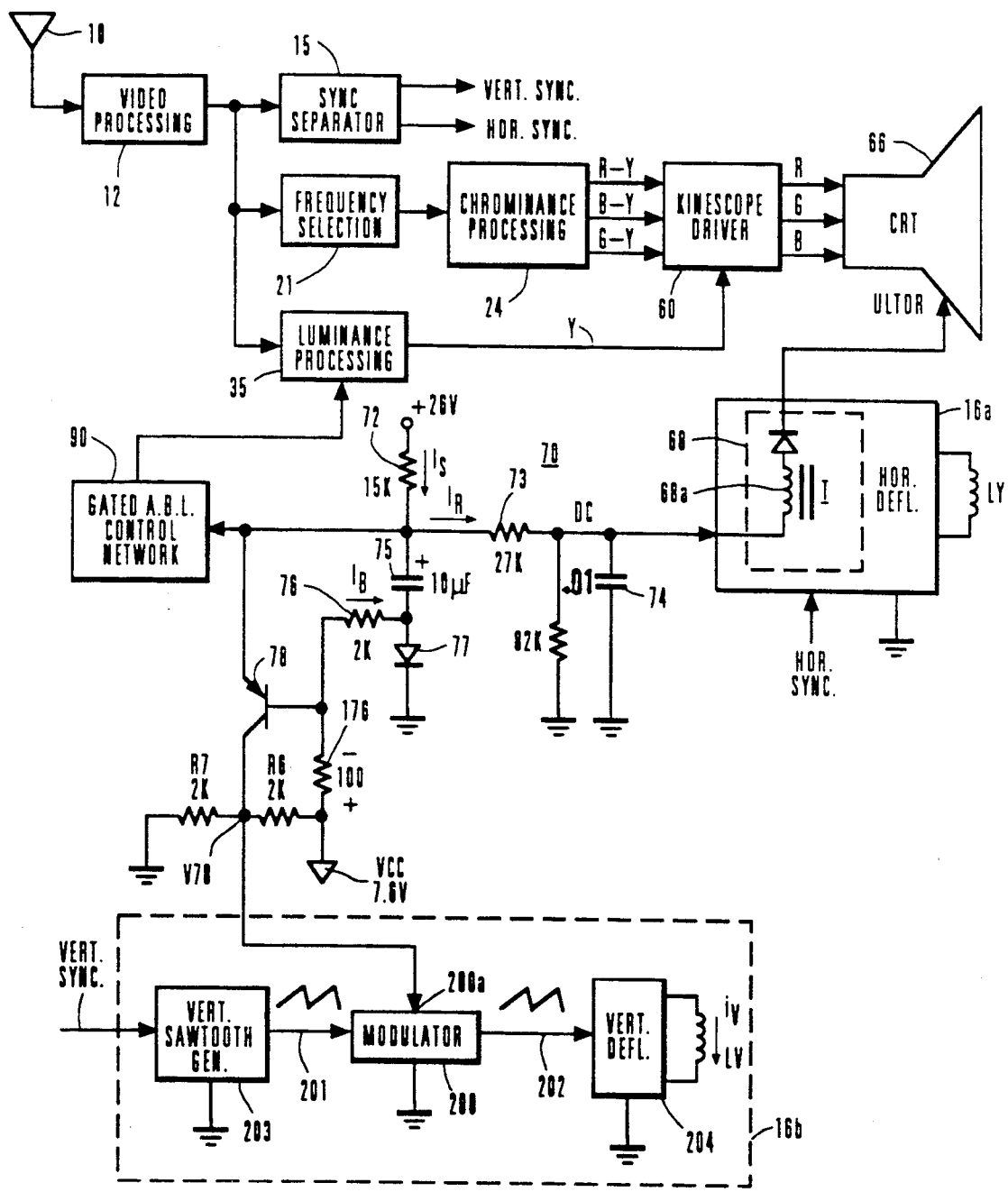

ARRANGEMENT FOR GENERATING A BEAM CURRENT INDICATIVE SIGNAL

The invention relates to a video display apparatus that generates a beam current indicative signal.

The accelerating potential, or the ultor voltage for the electron beams of a kinescope or a cathode ray tube (CRT) of a television receiver is obtained from the high voltage circuit of, for example, the horizontal output transformer. Both the height and the width of the raster tend to vary with variations in accelerating potential, the height and width increasing with decreasing ultor voltage. This effect is commonly called breathing. Decreasing ultor voltage can be caused by heavy beam current loading of the high voltage circuit of the output transformer as a result of heavy video loading. In some prior art circuits, to compensate for the decreasing ultor voltage, the amplitude of the vertical deflection current is decreased by means of supply voltage variation when the ultor voltage decreases.

U.S. Pat. No. 4,167,025, in the name of Willis, entitled, AUTOMATIC PEAK BEAM CURRENT LIMITER, referred to herein as the Willis' Patent, describes an arrangement for limiting excessive peak and average beam currents demanded by a kinescope in response to image representative video signals. A control signal derived by a sensing circuit in response to excessive beam current is applied to the kinescope in a manner to limit excessive beam currents above a threshold level.

In a typical vertical deflection circuit, the vertical deflection current is controlled by a vertical sawtooth signal. It may be desirable to utilize a control voltage derived by sensing the beam current for modulating the vertical sawtooth signal to compensate for breathing. In this way, advantageously, both the breathing correction and beam current limiting functions can be obtained using, for example, a common circuitry.

A video display deflection apparatus, embodying an aspect of the invention, includes a flyback transformer having a high voltage winding that is coupled to an ultor electrode of a cathode ray tube. High voltage pulses are generated in the high voltage winding to produce an ultor voltage and a beam current. An impedance is coupled in a current path that includes the high voltage winding for generating a first beam current indicative signal in accordance with a current in the high voltage winding. The beam current indicative signal is coupled to a beam current limiter for limiting excessive beam current. A clamping signal that varies in accordance with the beam current is generated. The clamping signal is coupled to the impedance in a manner to clamp said beam current indicative signal when the beam current is within a first range of values. A deflection circuit is responsive to the clamping signal for generating a deflection current that is modulated in accordance therewith in a manner to control the raster.

The sole FIGURE of the drawing shows, partially in block diagram form and partially in schematic circuit diagram form, an arrangement for varying an amplitude of a vertical deflection current, in accordance with an aspect of the invention.

The drawing depicts a color television receiver including a video signal processing unit 12 for receiving radio frequency signals from an antenna 10 and for translating these signals through intermediate frequency amplifying and detecting stages, not shown, to provide a composite video signal. The composite video signal contains luminance, chrominance, sound and synchronizing components.

A sync separator 15 serves to separate the synchronizing or sync components from the composite video signal to provide periodic line sync pulses HOR.SYNC and field sync pulses VERT.SYNC. These pulses are coupled to a horizontal deflection circuit 16a and to a vertical deflection circuit 16b embodying an inventive feature, respectively, for producing horizontal and vertical deflection currents.

A frequency selection unit 21 that includes a bandpass filter selectively couples the chrominance component of the composite video signal to chrominance signal processing unit 24 that includes demodulator stages to derive $R-Y$, $B-Y$ and $G-Y$ color difference signals. These signals are applied as inputs to a kinescope driver stage 60.

The luminance component of the composite video signal is amplified and otherwise processed by a luminance signal processing unit 35 in a luminance channel of the receiver. A luminance signal Y produced in unit 35 is supplied to an input of kinescope driver 60, where luminance signal Y is combined with the color difference signals from unit 24 to form R, B and G color signals. These signals are then coupled to cathode electrodes of a kinescope 66 for reproducing a color image.

High operating voltages for focus, not shown, and ultor electrodes of kinescope 66 are provided by a high voltage supply 68 in response to positive, periodic horizontal flyback pulses occurring during horizontal retrace scanning intervals. A current supply, including a source of positive direct voltage of $+26$ volts and a current determining resistor 72, provides a current $I_S$. Current $I_S$ is coupled to high voltage unit 68 via a resistor 73. Resistor 73 is coupled in series with a high voltage winding 68a of a horizontal flyback transformer T. Current flowing in resistor 72 includes a component $I_R$ representative of the beam current demand of the kinescope in response to the luminance and chrominance signals. This current flows into a low voltage end terminal of high voltage winding 68a and is sometimes referred to as a "resupply" current. The resupply current recharges or resupplies the ultor electrode capacitance of the kinescope when depleted as a result of beam current conduction. The resupply current typically consists of current pulses recurring at the horizontal line scanning rate. Some A.C. filtering of horizontal rate voltages which these current pulses tend to produce at the input terminal of high voltage winding 68a is provided by a filter capacitor 74.

Excessive levels of peak and average beam currents are sensed by a network 70. Sensing network 70 includes a large value, averaging filter capacitor 75 and a normally conductive clamp transistor 78, embodying an inventive feature. Network 70 also includes a normally conductive diode 77 for conductively coupling the negative plate of filter capacitor 75 to a reference potential or ground when, for example, beam current demand does not exceed a predetermined level under normal operating conditions of the receiver. Diode 77 is forward biased into conduction by a reference current $I_B$ supplied via a resistor 76 and a resistor 176 that are coupled in series from a source of positive D.C. supply voltage VCC of 7.6 volts.

A voltage representative of the level of resupply current $I_R$ is developed on the positive terminal of capacitor 75 when resupply current $I_R$ exceeds a predetermined threshold level indicating the presence of excessive peak or average beam current demand. This voltage is supplied to an input of a conventional gated automatic beam limiter (ABL) control network 90. Unit 90 then develops an output control signal in accordance with the magnitude of the excessive peak or average beam currents that limits excess beam currents.

A base voltage of transistor 78 is determined by voltage VCC and the voltage across resistor 176. During normal operating conditions, the emitter voltage of conductive transistor 78 clamps the voltage at the positive terminal of capacitor 75 to a voltage equal to the base voltage of transistor 78, of approximately +7 volts, plus the forward voltage across the emitter-base junction of transistor 78, or approximately 0.6 volts. A portion of current $I_S$ flows through the collector of clamp transistor 78 when conducting. The control signal output from ABL network 90 is inhibited when transistor 78 is conductive, whereby the luminance signal is processed in normal fashion by unit 35.

The value of resistor 72 and the voltage drop thereacross determine a normal level of current $I_S$. This current divides between transistor 78, when conducting, and the low level input of high voltage winding 68a in accordance with the beam current demand of kinescope 66 as manifested by the level of resupply current $I_R$.

When the average resupply current exceeds a first threshold level determined by current $I_S$, current drive for transistor 78 is depleted and transistor 78 ceases conducting. Since the positive terminal of capacitor 75 is no longer clamped by transistor 78, the voltage at this terminal decreases to a less positive level that is determined by current $I_R$. The ABL control network 90 responds to this less positive voltage by providing a corresponding output control signal which causes kinescope 66 to conduct proportionally less average beam current. Under this condition, diode 77 remains conductive and current $I_B$ flows to ground through diode 77, thereby preserving the role of capacitor 75 as a low pass, average responding filter.

In accordance with an aspect of the invention, as long as transistor 78 is conductive, variations of the beam current produce variations in a collector current and in a collector voltage V78 of transistor 78 that is developed between load resistors R6 and R7. Voltage V78 is coupled to a control terminal 200a of a modulator 200 of vertical deflection circuit 16b. Modulator 200 that may be implemented as a multiplier produces, from an input sawtooth signal 201, an output sawtooth signal 202 having an amplitude that varies in accordance with the beam current. Signal 201 is produced in a sawtooth generator 203 that is responsive to vertical sync signal VERT.SYNC.

As a result of the beam current variations that cause the amplitude signal 202 to change, an amplitude of a vertical deflection current iV, in a vertical deflection winding LV, produced in a vertical deflection amplifier 204 decreases when the beam current increases. The result is that a decrease in the ultor voltage caused as a result of an increase in the beam current is compensated by the decrease in the amplitude of current iV. Advantageously, the decrease in the amplitude of current iV maintains the raster height constant or independent of the beam current.

Advantageously, transistor 78 provides both voltage clamping action for beam current limiting purposes and beam current indicative voltage V78 for breathing prevention purposes. Consequently, the filtering provided in network 70 for beam current limiting purposes need not be duplicated for breathing prevention purposes. For safety reasons, coupling the low end of high voltage winding 68a to the network 70 requires careful conductor layout and the employment of current limiting resistor 73. By utilizing transistor 78 for the aforementioned dual purposes, the circuit that is coupled to the low end of winding 68a to modulator 200 can be, advantageously, simplified.

As explained in the Willis' Patent, that is incorporated by reference herein, the role of capacitor 75 as an average responding filter is altered when kinescope 66 momentarily demands high peak levels of resupply current. Specifically, in the case of excessive average current demand, a sudden large increase occurs in resupply current $I_R$ in response to beam current demand causes the positive terminal of capacitor 75 to become less positive when the first threshold level is exceeded.

Diode 77 ceases conducting when current $I_B$ flows through capacitor 75 instead of through diode 77 to ground, in accordance with the rate of change of capacitor 75 voltage and the magnitude of the peak resupply current demand. This effect is produced since the current through capacitor 75 is determined by the product of the value of the capacitor and the rate of change of voltage across the capacitor. Thus for a given value of capacitance, the capacitor current increases as the rate of change of capacitor voltage increases. In this instance, the rapid rate of change of the voltage across capacitor 75 is produced in response to the sudden increase in peak resupply current. This rapid rate of voltage change is essentially unaffected by the small value of horizontal rate filter capacitor 74.

Capacitor 75 is decoupled by nonconductive diode 77 from ground in the presence of a rapid increase in peak resupply current demand. Consequently, current $I_B$ then flows through capacitor 75 to the resupply current input of high voltage winding 68a. The beam current representative control voltage appearing at the positive terminal of capacitor 75 decreases rapidly in accordance with any further rapid increase in the level of resupply current $I_R$, since capacitor 75 no longer acts as a low pass, average responding filter during this condition.

What is claimed is:

1. A video display deflection apparatus for controlling a raster on a screen of a cathode ray tube, comprising:

a flyback transformer having a high voltage winding that is coupled to an ultor electrode of said cathode ray tube;

means coupled to said transformer for generating high voltage pulses in said high voltage winding to produce an ultor voltage and a beam current;

an impedance coupled in a current path that includes said high voltage winding for generating a first beam current indicative signal in accordance with a current in said high voltage winding, said beam current indicative signal being coupled to a beam current limiter for limiting excessive beam current;

means responsive to said beam current for generating a clamping signal that varies in accordance with said beam current and that is coupled to said impedance in a manner to clamp said beam current indicative signal when said beam current is within a first range of values; and a deflection circuit responsive to said clamping signal for generating a deflection current that is modulated in accordance therewith in a manner to control said raster.

2. An apparatus according to claim 1 wherein said clamping means comprises a transistor for generating said clamping signal at a first terminal of said transistor and for generating a second beam current indicative signal at a second terminal of said transistor, said second beam current indicative signal being coupled to said deflection circuit for modulating said deflection current.

3. An apparatus according to claim 1 further comprising, an amplifier for applying said clamping signal to said deflection circuit.

4. An apparatus according to claim 1 wherein said clamping means clamps said beam current indicative signal when said beam current is smaller than a threshold level.

5. A video display deflection apparatus for controlling a raster on a screen of a cathode ray tube, comprising:
   a flyback transformer having a high voltage winding that is coupled to an ultor electrode of said cathode ray tube;
   means coupled to said transformer for generating high voltage pulses in said high voltage winding to produce an ultor voltage and a beam current;
   an impedance coupled in a current path that includes said high voltage winding for generating a first beam current indicative signal in accordance with a current in said high voltage winding, said beam current indicative signal being coupled to a beam current limiter for limiting excessive beam current;
   a transistor having a first terminal that is coupled to said impedance for clamping said beam current indicative signal when said beam current is smaller than a first threshold current level, said transistor having a second terminal for producing at said second terminal a second beam current indicative signal that varies in accordance with said beam current; and
   a deflection circuit responsive to said second beam current indicative signal for generating a deflection current that is modulated in accordance therewith in a manner to control said raster when said beam current varies.

6. An apparatus according to claim 5 wherein said deflection circuit comprises a vertical sawtooth generator for generating an unmodulated, first sawtooth signal, a modulator responsive to said first sawtooth signal and to said second beam current indicative signal for producing a modulated sawtooth signal having an amplitude that is modulated in accordance with said second beam current indicative signal and a vertical deflection amplifier for generating a vertical deflection current having an amplitude that is modulated in a manner to compensate for a tendency of a height of said raster to vary when a variation in said beam current that produces a variation in an ultor voltage occurs.

7. An apparatus according to claim 5 wherein an emitter of said transistor is coupled to said impedance and a base of said transistor is coupled to a source of a voltage at a reference level such that an emitter-base forward voltage of said transistor determines a portion of said clamped first beam current indicative signal when said first beam current indicative signal is clamped.

8. An apparatus according to claim 5 wherein said first beam current indicative signal generating means comprises a source of a supply current coupled via said impedance, to said high voltage winding and to said transistor such that a first portion of said supply current flows in said high voltage winding and a second portion of said supply current flows in said first terminal of said transistor.

9. An apparatus according to claim 8 wherein said second portion of said current flows in said transistor when said beam current is smaller than said threshold current level.

10. An apparatus according to claim 9 wherein said transistor becomes nonconductive when said beam current exceeds said threshold current level.

11. An apparatus according to claim 5 further comprising, a filter element and switching means for coupling said filter element to said impedance so as to low-pass filter said first beam current indicative signal, said switching means having first and second switching states such that, when said switching means is at said first switching state, said first beam current indicative signal is low-pass-filtered more heavily than when said switching means is at said second switching state.

12. An apparatus according to claim 11 wherein said switching means is responsive to said beam current and assumes said first switching state when said beam current is smaller than a second threshold current level and said second switching state when said beam current is greater than said second threshold current level.

13. An apparatus according to claim 5 wherein said first and second terminals form corresponding main current conducting terminals of said transistor.

* * * * *